(12) United States Patent  
Choi et al.

(10) Patent No.: US 7,081,049 B2  
(45) Date of Patent: Jul. 25, 2006

(54) VENTILATING SYSTEM

(75) Inventors: In Ho Choi, Gunpo-si (KR); Jeong Yong Kim, Seoul (KR); Kyung Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/972,401

(22) Filed: Oct. 26, 2004

(65) Prior Publication Data

US 2005/0287944 A1 Dec. 29, 2005

(30) Foreign Application Priority Data

Jun. 24, 2004 (KR) .................. 10-2004-0047860

(51) Int. Cl.  
*F24F 7/06* (2006.01)

(52) U.S. Cl. .............. 454/234; 454/235; 454/299; 454/309

(58) Field of Classification Search ............... 454/228, 454/233, 234, 235, 299, 301, 303, 309, 313; 62/4, 9.3, 9.4  
See application file for complete search history.

(56) References Cited

U.S. PATENT DOCUMENTS

| | | | | |
|---|---|---|---|---|
| 3,363,531 A | * | 1/1968 | Kohlmeyer et al. | 454/236 |
| 3,367,258 A | * | 2/1968 | Erfeling | 454/234 |
| 3,561,345 A | * | 2/1971 | Kline et al. | 454/267 |
| 3,691,929 A | * | 9/1972 | Huling, Jr. | 454/234 |
| 3,722,395 A | * | 3/1973 | Courchesne | 454/235 |
| 4,079,665 A | * | 3/1978 | Martin | 454/235 |
| 4,570,532 A | * | 2/1986 | Labelle | 454/234 |
| 4,854,375 A | * | 8/1989 | Farina et al. | 165/53 |
| 5,127,238 A | * | 7/1992 | Ichikawa et al. | 62/244 |
| 5,376,045 A | * | 12/1994 | Kiser | 454/229 |
| 6,141,983 A | * | 11/2000 | Nishikawa et al. | 62/259.1 |
| 6,241,600 B1 | * | 6/2001 | Uehara | 454/252 |
| 6,688,966 B1 | * | 2/2004 | Akhtar | 454/235 |

* cited by examiner

*Primary Examiner*—Gregory Wilson  
(74) *Attorney, Agent, or Firm*—Greenblum & Bernstein, P.L.C.

(57) ABSTRACT

Ventilating system including a case mounted on a ceiling of a room, an inlet in a bottom surface of the case, and an outlet in a side surface of the case, a partition for dividing the case into an upper space, and a lower space, a fan in the upper space of the case, for drawing room air through the inlet, and discharging through the outlet, a first duct in communication with the upper space of the case for guiding outdoor air into the case, a second duct in communication with the lower space of the case for guiding the room air introduced into the case to an outside of the room, and a guide member provided to the outlet for guiding the air discharged into the room space toward a desired direction, thereby providing a ventilating system having an air purifying function, and preventing the air discharged into the room space from being directed to one side of the room.

20 Claims, 7 Drawing Sheets

VENTILATING SYSTEM

CROSS-REFERENCE TO RELATED APPLICATIONS

This application claims the benefit of Korean Application No. P2004-47860, filed on Jun. 24, 2004, which is hereby incorporated by reference as if fully set forth herein.

BACKGROUND OF THE INVENTION

1. Field of the Invention

The present invention relates to ventilating systems, and more particularly, to a ventilating system having an air purifying function, which can prevent air discharged into a room space from being directed to one side.

2. Discussion of the Related Art

In cases many people stay in a closed room, such as an office or a vehicle, the room is polluted with carbon dioxide, and the like, produced when the people breathe quickly, and the polluted air affects human bodies.

Therefore, it is necessary to change the polluted room air with outdoor fresh air, for which, in general, a ventilating system is used. Such a ventilating system is installed inside of a ceiling, for forced discharge of room air and introduction of outdoor air into the room by using a fan.

In the meantime, currently, for more comfortable room environment, in general an air purifier is provided to the room in addition to the ventilating system for collecting dust or microbes from the room air. The air purifier is installed on a room floor, for purifying the outdoor air introduced into the room, to maintain a room environment to be in a more comfortable state.

However, the related art ventilating system has the following problems.

First, since the related art ventilating system simply performs a function of discharging room air to an outside of the room, and introducing outdoor air into the room, cold or hot energy of the room is discharged to outside of room, carried on the room air during ventilation.

Therefore, when there is a great difference of temperatures between indoor and outdoor in, such as summer, or winter, the introduction of outdoor air causes to require additional cooling or heating of the room, to increase fuel cost, unnecessarily.

Second, the related art ventilating system, having neither dust collecting function, nor deodoring function, has a limitation in providing a comfortable room environment. Therefore, for more comfortable room environment, it is necessary to provide the air purifier in the room, additionally.

However, the air purifier, not only requires a large installation space, but also becomes out of order frequently by negligence of use. Moreover, the independent operation of the ventilating system and the air purifier causes difficulty in responding to change of operation conditions, and has a problem of high product costs.

SUMMARY OF THE INVENTION

Accordingly, the present invention is directed to a ventilating system that substantially obviates one or more problems due to limitations and disadvantages of the related art.

An object of the present invention is to provide a ventilating system having an air purifying function.

Another object of the present invention is to provide a ventilating system which can prevent air discharged into a room space from being directed to one side.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a ventilating system includes a case mounted on a ceiling of a room, an inlet in a bottom surface of the case, and an outlet in a side surface of the case, a partition for dividing the case into an upper space, and a lower space, a fan in the upper space of the case, for drawing room air through the inlet, and discharging through the outlet, a first duct in communication with the upper space of the case for guiding outdoor air into the case, a second duct in communication with the lower space of the case for guiding the room air introduced into the case to an outside of the room, and a guide member provided to the outlet for guiding the air discharged into the room space toward a desired direction.

The guide member includes a plurality of pass through holes for discharging air, a plurality of guide vanes between the pass through holes extended toward an inside of the case.

The guide member includes fastening portions at opposite ends for fastening the guide member to the case. The guide vane has a trapezoidal shape, with an upper side longer than a lower side.

Preferably, the guide member is curved with a curvature. Preferably, the guide vanes are extended toward a center of the fan.

The ventilating system further includes a filter assembly between the guide member and the fan for purifying air discharged into the room space. The filter assembly includes a dust collecting filter, photo-catalyst, and active carbon.

The fan is a turbo fan that draws air in an axial direction and discharges in a radial direction, and the partition has a pass through hole for making the upper space and the lower space in communication.

The pass through hole is under the fan, and the ventilating system further includes a first damper on an underside surface of the partition for selective closure of the pass through hole. The first damper is mounted to be slidable along the under side surface of the partition.

The ventilating system further includes a second damper on an upper surface of the partition for making the upper space and the first duct in communication, selectively. The second damper is rotatably mounted on the upper surface of the partition with a hinge.

The first duct includes a suction fan mounted thereon for drawing outdoor air into the upper space of the case, and the second duct includes a discharge fan mounted thereon for forced discharge of room air to an outside of room.

The first, and second ducts are respectively provided with third, and fourth dampers for selective closure of the first, and second ducts. The first duct is provided with a suction fan for drawing outdoor air into the upper space of the case, and the second duct is provided with a discharge fan for forced discharge of room air to an outside of the room.

The first, and second ducts cross each other where a preheat exchanger is mounted for making heat exchange between the room air and the outdoor air.

The outlet is provided with a sensor for measuring carbon dioxide contained in the room air.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
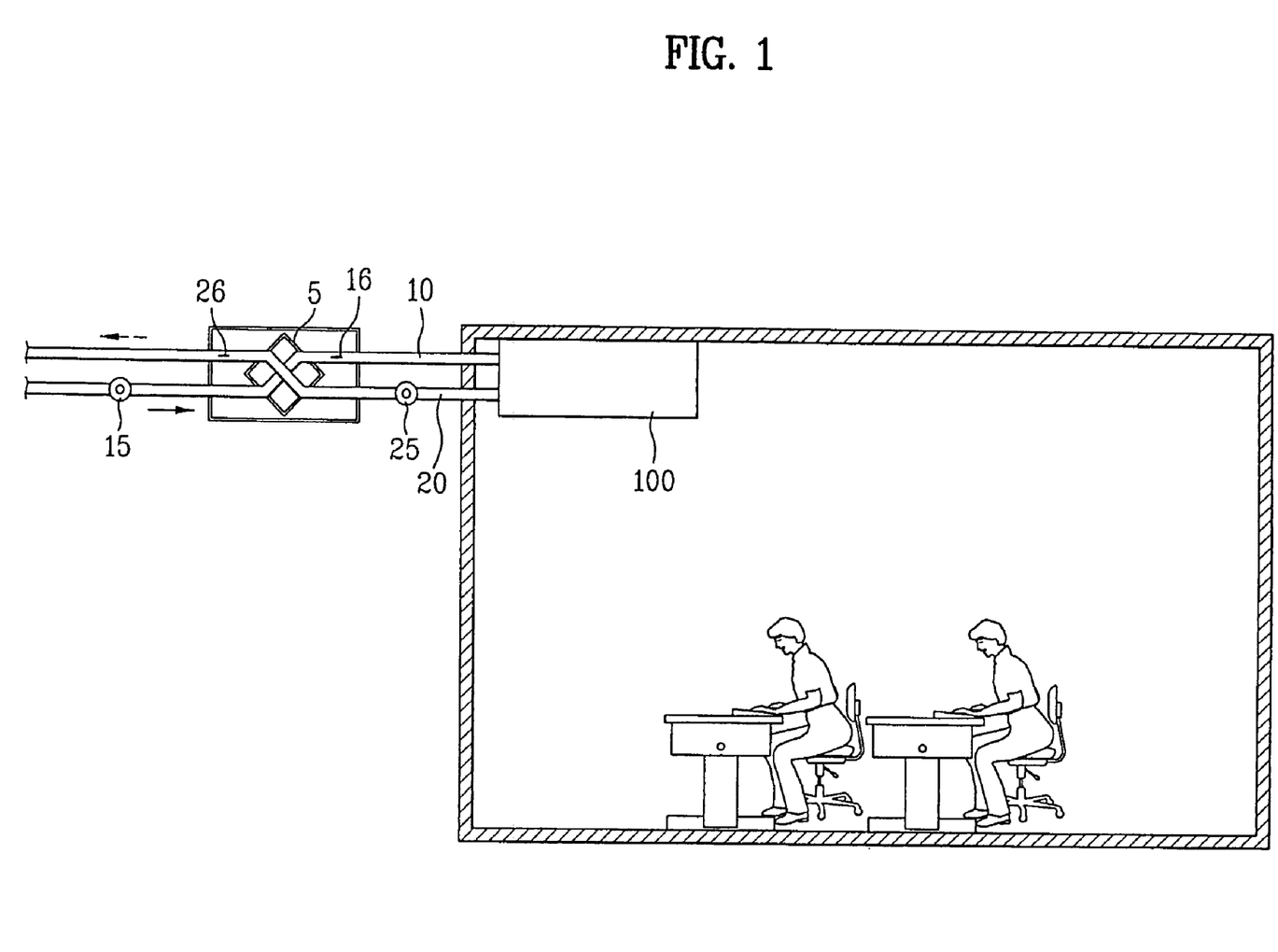
FIG. 1 illustrates a diagram of a ventilating system in accordance with a preferred embodiment of the present invention installed in a room, schematically.
Figure 2:
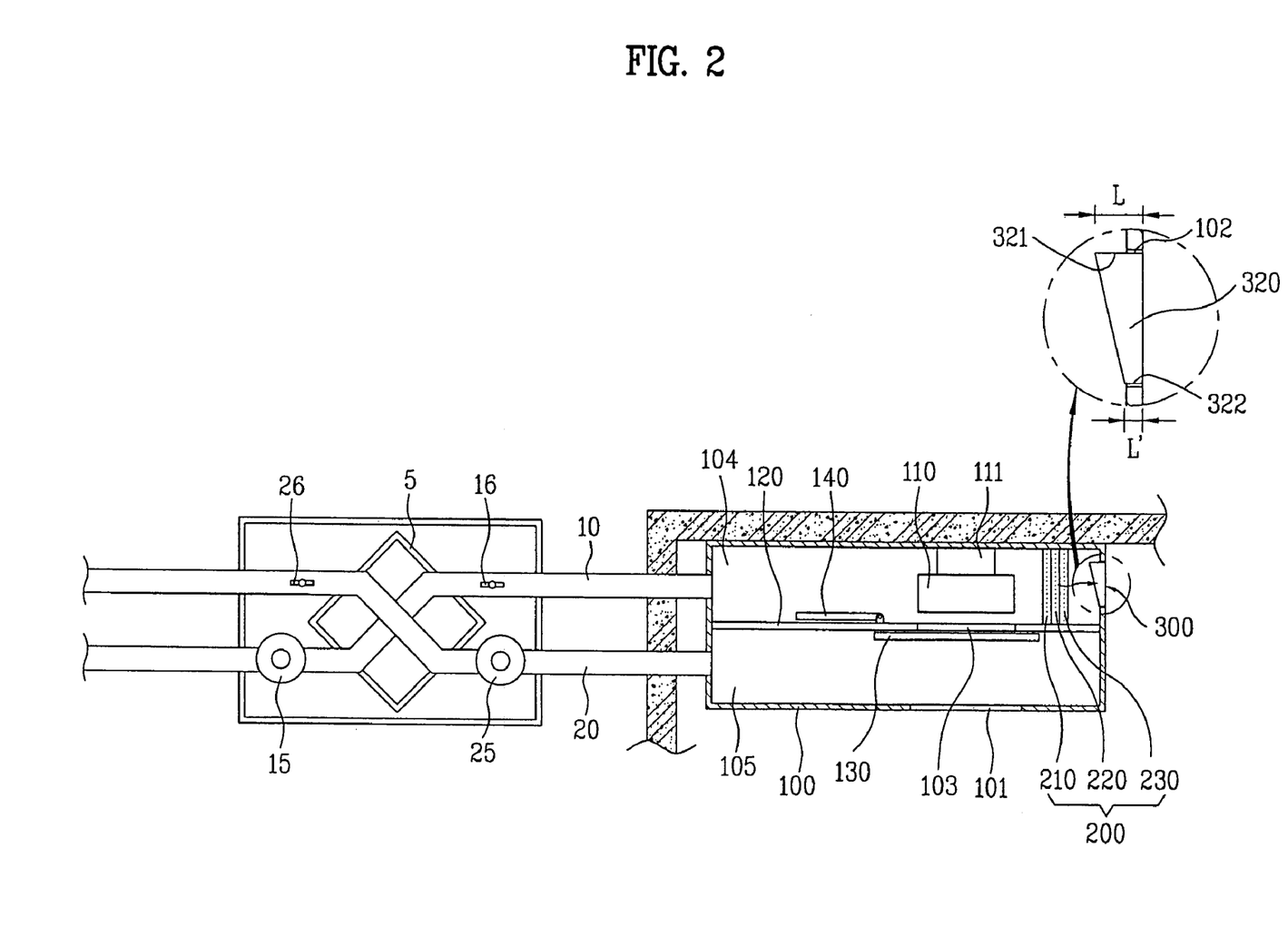
FIG. 2 illustrates a section of detail of the ventilating system in accordance with a preferred embodiment of the present invention.

FIG. 1 illustrates a diagram of a ventilating system in accordance with a preferred embodiment of the present invention installed in a room, schematically, and FIG. 2 illustrates a section of detail of the ventilating system in accordance with a preferred embodiment of the present invention.

Referring to FIGS. 1 and 2, the ventilating system includes a case 100 mounted on a ceiling of a room, a partition for dividing the case 100 into an upper space 104, and a lower space 105, and first, and second ducts 10, and 20 connected to the case 100.

The first duct 10, in communication with the upper space 104 of the case 100, guides outdoor air to an inside of the case 100, and the second duct 20, in communication with the lower space 105, guides room air introduced into the inside of the case 100 to an outside of the room. For this, the first, and second ducts 10, and 20 are passed through an outside wall of the room, and extended to an outside of the room.

The first duct 10 has a suction fan 15 mounted thereon for drawing outdoor air into the upper space 104 of the case 100, and the second duct 20 has a discharge fan 25 mounted thereon for forced discharge of room air to an outside of the room.

The first, and second ducts 10, and 20 are provided with third, and fourth dampers 16, and 26 for selective closure of the first, and second ducts 10, and 20 depending on an operation condition. In more detail, the third, and fourth dampers 16, and 26 respectively close the first, and second ducts 10, and 20 when the ventilating system is operating in an air purifying mode, and respectively open the first, and second ducts 10, and 20 when the ventilating system is operating in a ventilating mode.

In the air purifying mode, the ventilating system purifies room air, and, in the ventilating mode, the ventilating system ventilates the room, in which room air is discharged to an outside of the room, and outdoor air is supplied to the room.

The case 100 has an inlet 101 in a bottom surface, and an outlet 102 in a side surface. The inlet 101 makes the lower space 104 of the case 100 in communication with the room space, and the outlet 102 makes the upper space 105 of the case 100 in communication with the room space.

Accordingly, outdoor air guided to the upper space 104 of the case 100 through the first duct 10 is discharged to the room space through the outlet 102, and the room air discharged to outside of the room through the second duct 20 is introduced into the lower space 105 of the case 100 through the inlet 101.

In the meantime, the outlet 102 is provided with a filter assembly 200, for purifying the air being discharged to the room space to provide fresher air to the room space.

In more detail, the outdoor air guided to the upper space 104 of the case 100 through the first duct 10 passes through, and purified at the filter assembly 200 before being discharged through the outlet 102, to provide fresher air to the room space.

The filter assembly 200 includes a dust collecting filter 210, photo-catalyst 220, and active carbon 230. The dust collecting filter 210 filters dust from air, and the photo-catalyst 220 and the active carbon 230 are carbon having a strong adsorption capability, and absorb odor from air.

The dust collecting filter 210 is an HEPA (High Efficiency Particulate Arrestor) filter, or an ULPA (Ultra Low Penetration Absolute) filter.

The HEPA filter can remove particles, such as dust, bacteria, virus, and the like, larger than 0.3 micron, up to 99.97%, and the ULPA filter, having a better performance than the HEPA filter, can remove particles, such as fine dust, bacteria, virus, and the like, with a size ranging 0.1~0.01 micron, up to 99.999%.

In the meantime, in the upper space 104 of the case 100, there is a fan 110 for forced circulation of the room air. The fan 110 draws the room air into an inside of the case 100 through the inlet 101, and discharges to the room space through the outlet 102. In this instance, the room air is passed through, and purified at the filter assembly 200, before being discharged into the room space.

Therefore, because the room air is circulated forcibly by the fan 110, and purified by the filter assembly 200 continuously, even if the room is not ventilated, the room space can be kept in a comfortable state.

In the meantime, the partition 120 has a pass through hole 103 in one side for making the upper space 104 and the lower space in communication. The pass through hole 103 is under the fan 110, for direct transmission of a suction force from the fan 110 to the inlet 101.

Therefore, the room air introduced into the case 100 by the fan 110 moves to the upper space 104 through the pass through hole 103, and is discharged to the room space through the filter assembly 200, and the outlet 102.

It is preferable that the fan 110 is a turbo-fan that draws air in an axial direction and discharges in a radial direction. The fan 110 is coupled to a motor 111 with a shaft for transmission of a driving force.

On an underside of the partition, there is a first damper 130 for selective closure of the pass through hole 103. The first damper 130 closes the pass through hole 103 when the ventilating system is in a ventilating mode, for preventing the room air from being introduced into the upper space 104.

According to this, the room air introduced into the lower space 105 through the inlet 101 is not mixed with the outdoor air introduced into the upper space 104, and discharged to outside of the room following the second duct 20.

It is preferable that the first damper 130 is mounted to be slidable along an underside surface of the partition 120.

On an upper surface of the partition 120, there is a second damper 140 for making the upper space 104 and the first duct 10 in communication depending on an operation condition.

In more detail, in the ventilating mode of the ventilating system, the second damper 140 makes the upper space 104 and the first duct 10 in communication, for introduction of the outdoor air into the upper space 104, and in the air purifying mode of the ventilating system, the damper 140 closes between the upper space 104 and the first duct 10, for prevention of the room air from being introduced into the first duct 10.

To do this, the second damper 140 is rotatably mounted on the upper surface of the partition 120 with a hinge.

In the meantime, the air discharged into the room space through the outlet shows an air flow directed to one side. Particularly, the air discharged into the room space by the fan 110 flows in a tangential direction of the fan 110.

Therefore, the air discharged into the room space by the fan 110 is directed to a corner of the room, failing in direct supply of fresh air to a central part of the room where people make activities mostly.

To prevent this, the outlet 102 is provided with a guide member 300 for guiding the air discharged into the room space to a desired direction. The guide member 300 directs the air to the central part of the room.

Figure 3:
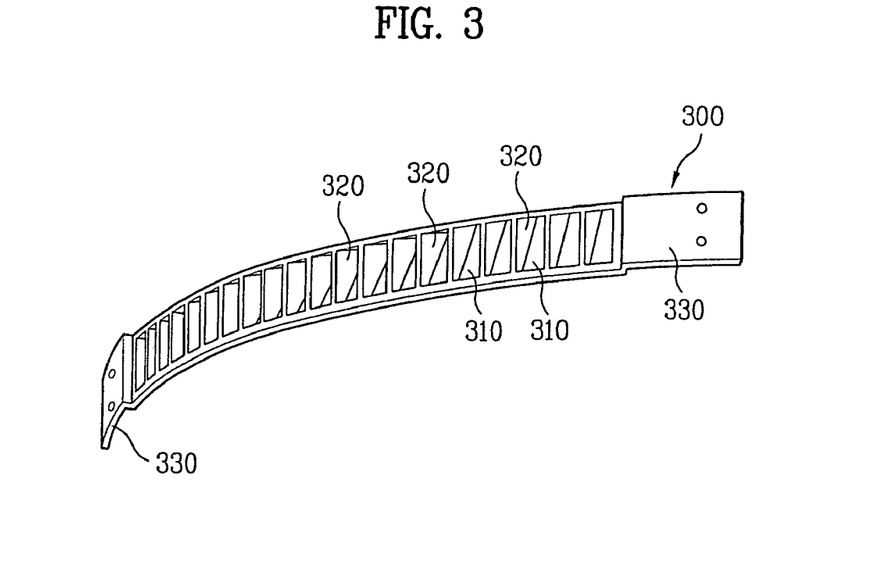
FIG. 3 illustrates a perspective view of a guide member in accordance with a preferred embodiment of the present invention, in detail.

FIG. 3 illustrates a perspective view of a guide member in accordance with a preferred embodiment of the present invention in detail.

Referring to FIG. 3, the guide member 300 includes a plurality of pass through holes 310 for discharging the air, and a plurality of guide vanes 320 between the pass through holes 310.

Each of the guide vanes 320 is extended toward an inside of the case 100, for guiding an air flow discharged into the room space through the pass through hole 310. That is, each guide vane 320 forms one pair with an adjacent guide vane 320 to form a flow passage for guiding the air.

Accordingly, the air discharged into the room space is guided along a flow passage the vanes 320 form to the pass through holes 310.

Referring to FIG. 2, it is preferable that the guide vane 320 has a trapezoidal shape, with a length 'L' of an upper side 321 greater than a length 'L" of a lower side 322. That is, the guide vane 320 has a length which becomes the longer as it goes upward the farther.

The guide vane 320 makes the air discharged through the pass through hole 310 to have a uniform flow speed.

In more detail, in general, the air discharged to the outlet 102 by the fan 110 has a speed faster in an upper portion of the outlet 102 than in a lower portion of the outlet 102. As described, if an upper portion of the guide vane 320 is longer than a lower portion of the guide vane 320, the air flowing along the upper portion of the outlet 102 becomes to be in contact with the guide vane 320 for a period longer than the air flowing along the lower portion of the guide vane 320, resulting to receive a greater frictional resistance.

Therefore, the air flowing along the upper portion of the guide vane 320 is involved in a flow speed reduction due to friction against the guide vane 320, such that the flow speed of the air flowing along the upper portion of the guide vane 320 becomes the same with the flow speed of the air flowing along the lower portion of the guide vane 320.

At the end, the guide vane 320 makes the flow speed of the air discharged into the room space through the pass through hole 310 uniform, and according to this, a flow rate of the air discharged into the room space becomes uniform.

The guide member 300 has fastening portions 330 at opposite ends for securing to the case 100. The fastening portions 330 are fastened to the case 100 with screws, or the like, for fixedly securing the guide member 300 to the outlet 102.

Figure 4:
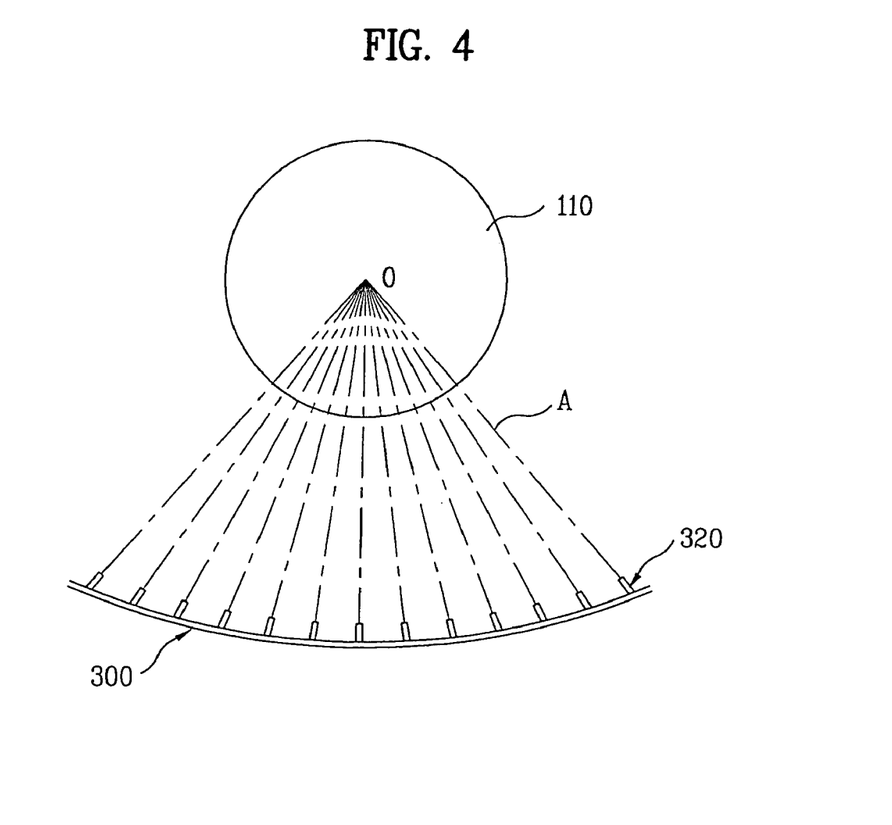
FIG. 4 illustrates a diagram of a structure of guide vanes in accordance with a preferred embodiment of the present invention.

FIG. 4 illustrates a diagram of a structure of guide vanes in accordance with a preferred embodiment of the present invention.

In the meantime, referring to FIG. 4, it is preferable that the guide member 300 is curved with a curvature. It is preferable that the guide vanes 320 extend toward a center of the fan 110. That is, the guide vanes 320 are formed such that imaginary extension lines 'A' from each of the guide vanes 320 pass the center 'O' of the fan 110.

Such structures of the guide member 300, and the guide vanes 320 enable the air discharged into the room space, with the air spread widely, permitting to supply fresh air to all parts of the room, quickly.

In the meantime, the first, and second ducts 10, and 20 cross each other where a preheat exchanger 5 is provided for making heat exchange between the room air and the outdoor air.

Figure 5:
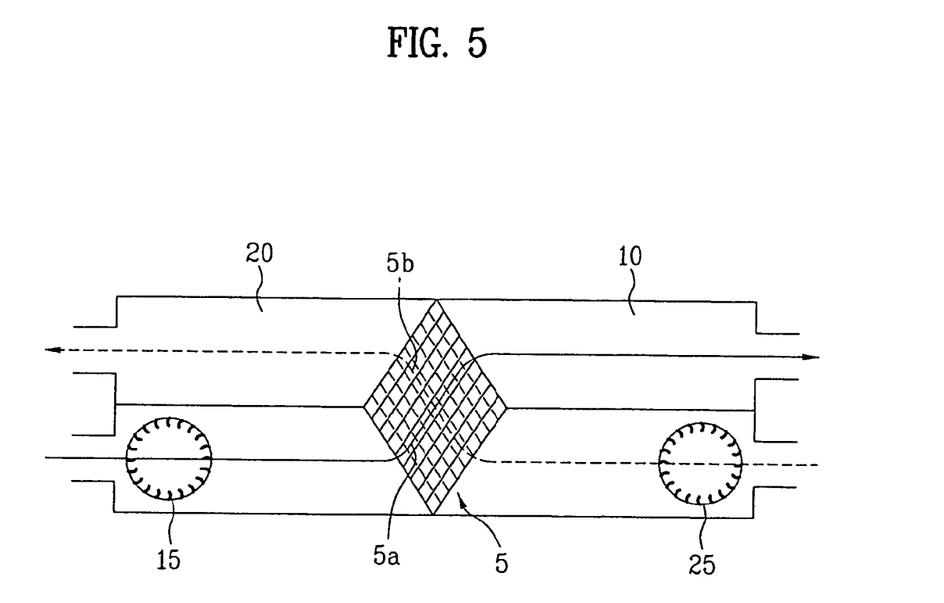
FIG. 5 illustrates a section of a preheat exchanger in accordance with a preferred embodiment of the present invention.

FIG. 5 illustrates a section of a preheat exchanger in accordance with a preferred embodiment of the present invention.

Referring to FIG. 5, the preheat exchanger 5 has a hexahedral shape provided with a plurality of first, and second flow passages 5a, and 5b in contact with one another therein. The first flow passages 5a are in communication with the first duct 10, and the second flow passages 5b are in communication with the second duct 20.

A heat exchange film (not shown) having a good heat transfer efficiency is provided at an interface of the first flow passage 5a and the second flow passage 5b.

In the meantime, it is preferable that the preheat exchanger 5 is configured to be connected to the first, and second duct 10, and 20 or a bypass pipe (not shown).

In more detail, the heat exchange between the room air and the outdoor air with the preheat exchanger 5 is performed in a case there is a great temperature difference between the room and the outdoor like summer or winter. If the room air and the outdoor air pass through the preheat exchanger 5, a more time period is required for ventilation because flow speeds of the room air and the indoor air become slow.

Accordingly, in a case there is almost no temperature difference between the room and the outdoor, such as spring or autumn, to require no heat exchange, it is preferable that the first, and second ducts 10, and 20 are connected to bypass pipes (not shown) provided separately respectively, for fast ventilation.

The operation of the ventilating system of the present invention will be described, for a ventilating mode and an air purifying mode, separately.

Figure 6:
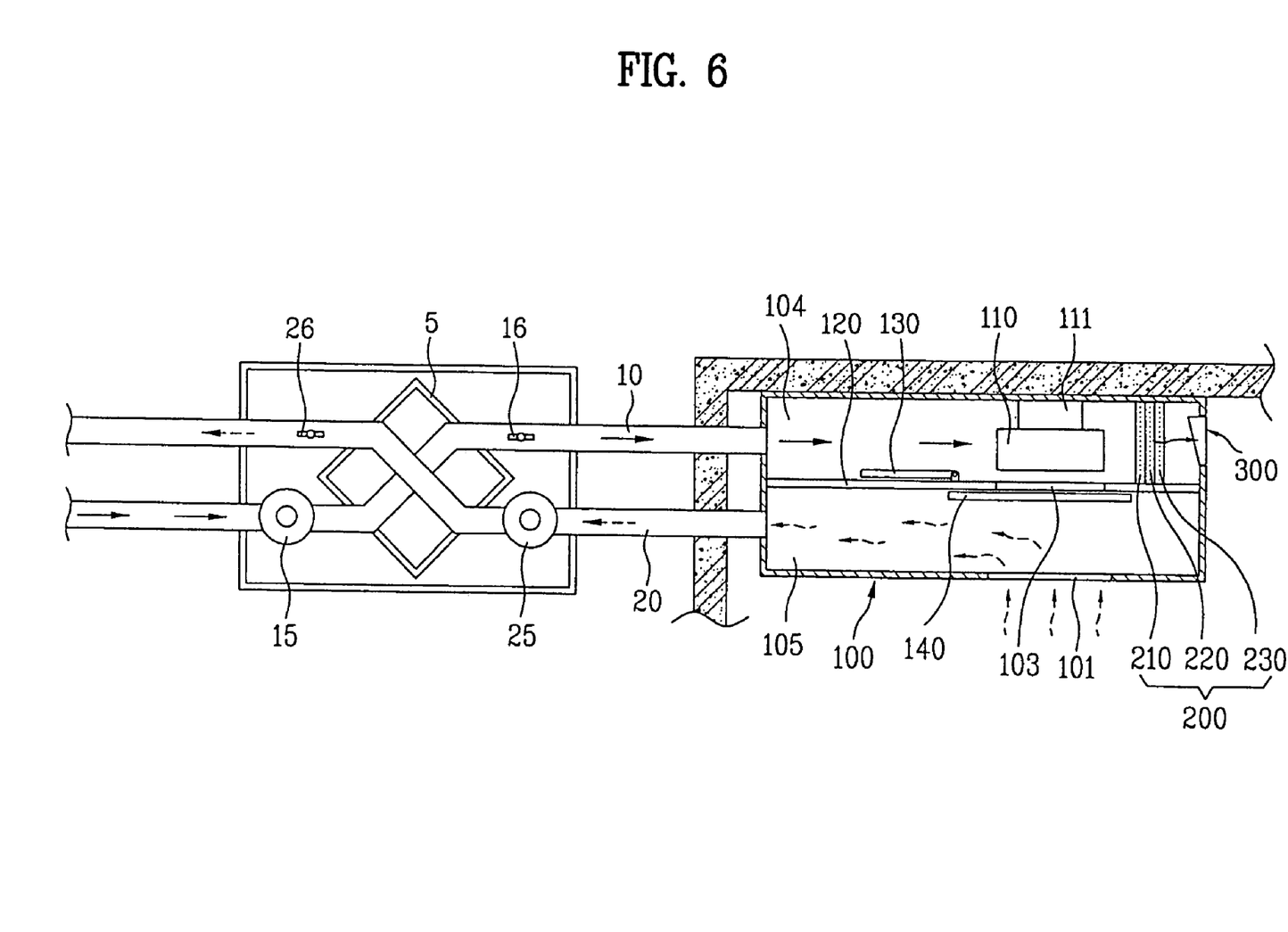
FIG. 6 illustrates a section of a ventilating system in accordance with a preferred embodiment of the present invention operating in a ventilating mode.
Figure 7:
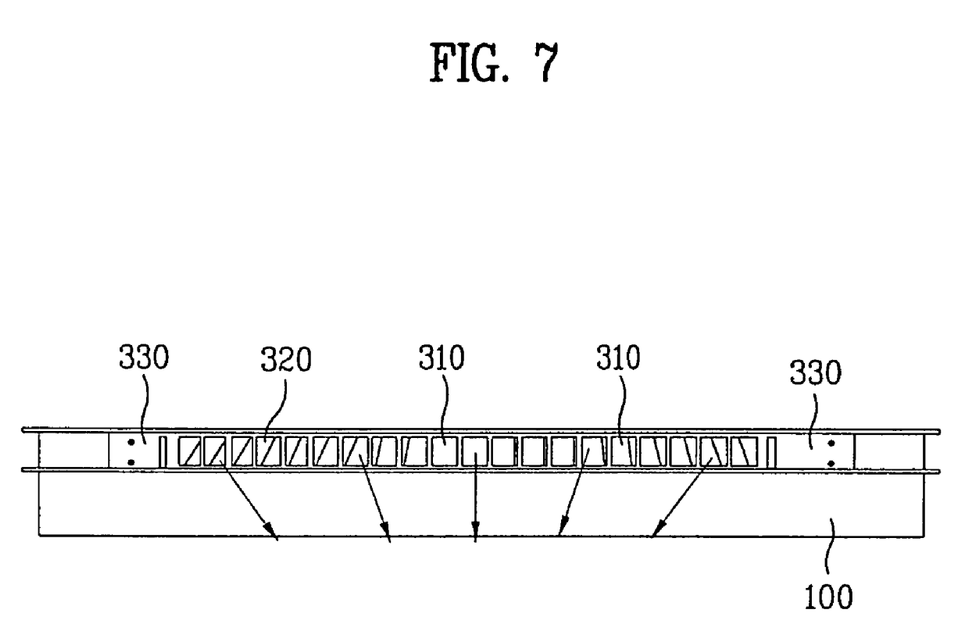
FIG. 7 illustrates a diagram of an air flow discharged into a room space through a guide member in accordance with a preferred embodiment of the present invention.

FIG. 6 illustrates a section of a ventilating system in accordance with a preferred embodiment of the present invention operating in a ventilating mode, and FIG. 7 illustrates a diagram of an air flow discharged into a room space through a guide member in accordance with a preferred embodiment of the present invention.

Referring to FIG. 6, in the ventilating mode, the fan 110 is not in operation, and the damper 130 closes the pass through hole 103 in the partition 120.

The second damper 140 is positioned parallel to the partition 120, to make the upper space 104 and the first duct 10 in communication, and the third, and fourth dampers 16, and 26 open the first, and second ducts 10, and 20. Under this state, the suction fan 15, and the discharge fan 25 on the first, and second ducts 10, and 20 are put into operation.

At first, when the suction fan 15 is put into operation, the outdoor air flows toward the outlet 102 through the first duct 10, and the upper space 104 of the case 100. In this instance, the outdoor air passes through, and purified at the filter assembly 200, and, as shown in FIG. 7, is made to be discharged into the room space at a uniform speed and a fixed flow rate by the guide member 300.

Upon putting the discharge fan 25 into operation, the room air is introduced into lower space 105 through the inlet 101, and discharged to outside of room through the second duct 20.

Thus, the room is ventilated as the polluted air is discharged from the room to outside of room by the discharge fan 25, and fresh air is supplied from the outdoor to the room by the suction fan 15. In this instance, the outdoor air is made to be discharged toward the central part of room by the guide member 300 after the air is purified by the filter assembly 200.

In the meantime, the room air and the outdoor air respectively flowing along the first, and second ducts 10, and 20 are made to pass through the preheat exchanger 5 in a case the temperature difference between the room and the outdoor is great. According to this, heat exchange is made between the room air and the outdoor air, to prevent unwanted waste of energy.

However, when the temperature difference between the room and the outdoor is small, like spring or autumn, the room air and the outdoor air flow along the bypass pipes (not shown) respectively as described before, without passing through the preheat exchanger 5.

Figure 8:
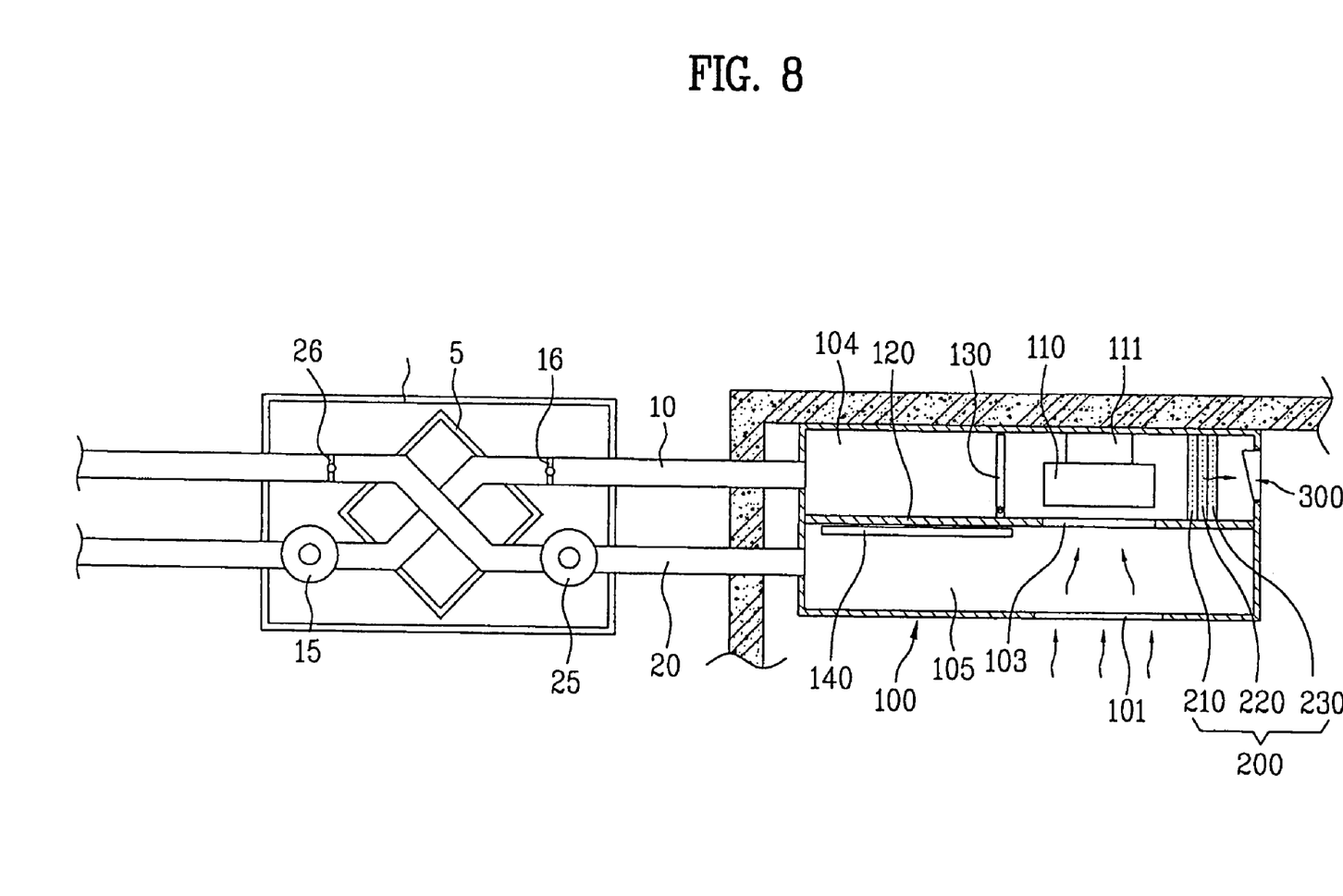
FIG. 8 illustrates a section of a ventilating system in accordance with a preferred embodiment of the present invention operating in an air purifying mode.

FIG. 8 illustrates a section of a ventilating system in accordance with a preferred embodiment of the present invention operating in an air purifying mode.

Referring to FIG. 8, in a case the ventilating system is in the air purifying mode, the suction fan 15, and the discharge fan 25 are not in operation, and the first damper 130 is slid to open the pass through hole 103 in the partition 120.

The second damper 140 rotates vertical to the partition 120 to close between the upper space 104 and the first duct 10, and the third, and fourth dampers 16, and 26 close the first, and second ducts 10, and 20.

In this state, upon putting the fan 110 into operation, the room air is discharged into the room again via the inlet 101, the pass through hole 103, and the pass through holes 310 in the guide member 300. In this instance, the room air is made to be discharged into the room space again at a uniform flow speed and a flow rate by the guide member 300 after the room air passes through, and purified at the filter assembly 200.

Thus, the ventilating system of the present invention is operated not only in a ventilating mode, but also in an air purifying mode, and depending on a condition, the room air and the outdoor air are made to heat exchange at the preheat exchanger 5.

In the meantime, the operation modes of the ventilating system are fixed according to a degree of pollution of the room air. That is, the ventilating system is operated in the ventilating mode in a case the degree of the pollution is high, and the ventilating system is operated in the air purifying mode in a case the degree of the pollution is low.

The degree of room air pollution is measured with a sensor (not shown) mounted at the inlet 101. The sensor measures an amount of carbon dioxide in the room air, for determining the degree of pollution of the room air.

For an example, if the amount of carbon dioxide measured by the sensor is more than 800 PPM, it is determined that the degree of room air pollution is high, when the ventilating system is operated in the ventilating mode.

As has been described, the ventilating system of the present invention has the following advantages.

First, the ventilating system of the present invention is provided with, not only a ventilating function, but also an air purifying function, to dispense with a separate air purifier in the room like the related art, permitting effective use of the room space, and to save an expense required for buying the air purifier.

Second, the ventilating system of the present invention supplies air to a room space in a purified state as outdoor air passes through a filter assembly even in a ventilating mode, thereby permitting supply of fresher air to the room.

Third, the ventilating system of the present invention prevents the air discharged into a room from being directed to one side by using a guide member provided to an outlet. Accordingly, fresh air can be supplied to all parts of the room, particularly to a central part of the room where people make activities mostly, thereby maintaining more comfortable room space.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A ventilating system comprising:
   a case mounted on a ceiling of a room;
   an inlet in a bottom surface of the case, and an outlet in a side surface of the case;
   a partition for dividing the case into an upper space, and a lower space;
   a fan in the upper space of the case, for drawing room air through the inlet, and discharging through the outlet;

a first duct in communication with the upper space of the case for guiding outdoor air into the case;

a second duct in communication with the lower space of the case for guiding the room air introduced into the case to an outside of the room; and a guide member provided to the outlet for guiding the air discharged into the room space toward a desired direction.

2. The ventilating system as claimed in claim 1, wherein the guide member includes;

a plurality of pass through holes for discharging air, a plurality of guide vanes between the pass through holes extended toward an inside of the case.

3. The ventilating system as claimed in claim 2, wherein the guide member includes fastening portions at opposite ends for fastening the guide member to the case.

4. The ventilating system as claimed in claim 2, wherein the guide vane has a trapezoidal shape, with an upper side longer than a lower side.

5. The ventilating system as claimed in claim 2, wherein the guide member is curved with a curvature.

6. The ventilating system as claimed in claim 2, wherein the guide vanes are extended toward a center of the fan.

7. The ventilating system as claimed in claim 1, further comprising a filter assembly between the guide member and the fan for purifying air discharged into the room space.

8. The ventilating system as claimed in claim 7, wherein the filter assembly includes a dust collecting filter, photocatalyst, and active carbon.

9. The ventilating system as claimed in claim 1, wherein the fan is a turbo fan that draws air in an axial direction and discharges in a radial direction.

10. The ventilating system as claimed in claim 1, wherein the partition has a pass through hole for making the upper space and the lower space in communication.

11. The ventilating system as claimed in claim 10, wherein the pass through hole is under the fan.

12. The ventilating system as claimed in claim 10, further comprising a first damper on an underside surface of the partition for selective closure of the pass through hole.

13. The ventilating system as claimed in claim 12, wherein the first damper is mounted to be slidable along the under side surface of the partition.

14. The ventilating system as claimed in claim 1, further comprising a second damper on an upper surface of the partition for making the upper space and the first duct in communication, selectively.

15. The ventilating system as claimed in claim 14, wherein the second damper is rotatably mounted on the upper surface of the partition with a hinge.

16. The ventilating system as claimed in claim 1, wherein the first duct includes a suction fan mounted thereon for drawing outdoor air into the upper space of the case, and the second duct includes a discharge fan mounted thereon for forced discharge of room air to an outside of room.

17. The ventilating system as claimed in claim 1, wherein the first, and second ducts are respectively provided with third, and fourth dampers for selective closure of the first, and second ducts.

18. The ventilating system as claimed in claim 17, wherein the first duct is provided with a suction fan for drawing outdoor air into the upper space of the case, and the second duct is provided with a discharge fan for forced discharge of room air to an outside of the room.

19. The ventilating system as claimed in claim 1, wherein the first, and second ducts cross each other where a preheat exchanger is mounted for making heat exchange between the room air and the outdoor air.

20. The ventilating system as claimed in claim 1, wherein the outlet is provided with a sensor for measuring carbon dioxide contained in the room air.

* * * * *